US010461408B2

(12) United States Patent
Xu et al.

(10) Patent No.: US 10,461,408 B2
(45) Date of Patent: Oct. 29, 2019

(54) ELECTRICAL TILT APPARATUS, ANTENNA, AND ELECTRICAL TILT METHOD

(71) Applicant: Huawei Technologies Co., Ltd., Shenzhen, Guangdong (CN)

(72) Inventors: Honggang Xu, Shanghai (CN); Yun Feng, Shenzhen (CN); Jian Shen, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/821,512

(22) Filed: Nov. 22, 2017

(65) Prior Publication Data
US 2018/0097279 A1    Apr. 5, 2018

Related U.S. Application Data

(63) Continuation of application No. PCT/CN2015/079840, filed on May 26, 2015.

(51) Int. Cl.
*H04Q 1/24* (2006.01)
*H01Q 1/24* (2006.01)
(Continued)

(52) U.S. Cl.
CPC ............. *H01Q 1/246* (2013.01); *H01Q 1/24* (2013.01); *H01Q 3/005* (2013.01); *H01Q 3/36* (2013.01);
(Continued)

(58) Field of Classification Search
CPC .......... H01Q 1/246; H01Q 3/005; H01Q 3/38; H01Q 21/22; H01Q 1/24; H01Q 3/36; H04L 27/04
(Continued)

(56) References Cited

U.S. PATENT DOCUMENTS

2001/0033247 A1    10/2001   Singer et al.
2002/0132644 A1     9/2002   Mellor et al.
(Continued)

FOREIGN PATENT DOCUMENTS

CN    101740864 A    6/2010
CN    102136630 A    7/2011
(Continued)

OTHER PUBLICATIONS

Yang; "Application and Design of Base Station Built-in Multi-port AISG Control Unit",Telecommunication Engineering, vol. 52 No. 9; Sep. 2012; 13 pages. (Year: 2012).*
(Continued)

*Primary Examiner* — Edward F Urban
*Assistant Examiner* — Angelica M Perez
(74) *Attorney, Agent, or Firm* — Womble Bond Dickinson (US) LLP

(57) ABSTRACT

An electrical tilt apparatus is provided, to ensure that when a quantity of serial ports on a remote control unit (RCU) is limited, independent electrical tilt on RF signals is provided. The apparatus includes: an RCU, and at least one combiner unit and multiple phase shifters connected to the RCU. Each of the at least one combiner units is connected to a different serial port on the RCU and connected to at least two RF modules; receives, at each time, an electrical tilt signal from one of the RF modules, and sends the electrical tilt signal to the RCU. The RCU receives the electrical tilt signal from each combiner unit, and drives, according to the electrical tilt signal, a first phase shifter that corresponds to a first RF module to move.

16 Claims, 7 Drawing Sheets

(51) Int. Cl.
  *H01Q 3/36* (2006.01)
  *H01Q 3/00* (2006.01)
  *H01Q 3/38* (2006.01)
  *H01Q 21/22* (2006.01)
  *H04L 27/04* (2006.01)

(52) U.S. Cl.
  CPC ............... *H01Q 3/38* (2013.01); *H01Q 21/22* (2013.01); *H04L 27/04* (2013.01)

(58) Field of Classification Search
  USPC .......... 455/63.3–63.4, 67.16–69, 75, 78, 92, 455/101–103, 110, 114.2; 370/319–321, 370/334, 344; 375/135–136, 144, 375/147–148, 219, 265, 269, 271–274, 375/299, 310
  See application file for complete search history.

(56) References Cited

U.S. PATENT DOCUMENTS

2011/0237315 A1  9/2011  Seeor et al.
2015/0029057 A1  1/2015  Zhang et al.

FOREIGN PATENT DOCUMENTS

| CN | 102273013 | * | 12/2011 |
| CN | 102273013 A | | 12/2011 |
| CN | 104639216 A | | 5/2015 |

OTHER PUBLICATIONS

Yang; "Application and Design of Base Station Built-in Multi-port AISG Control Unit",Telecommunication Engineering, vol. 52 No. 9; Sep. 2012; 13 pages.

* cited by examiner

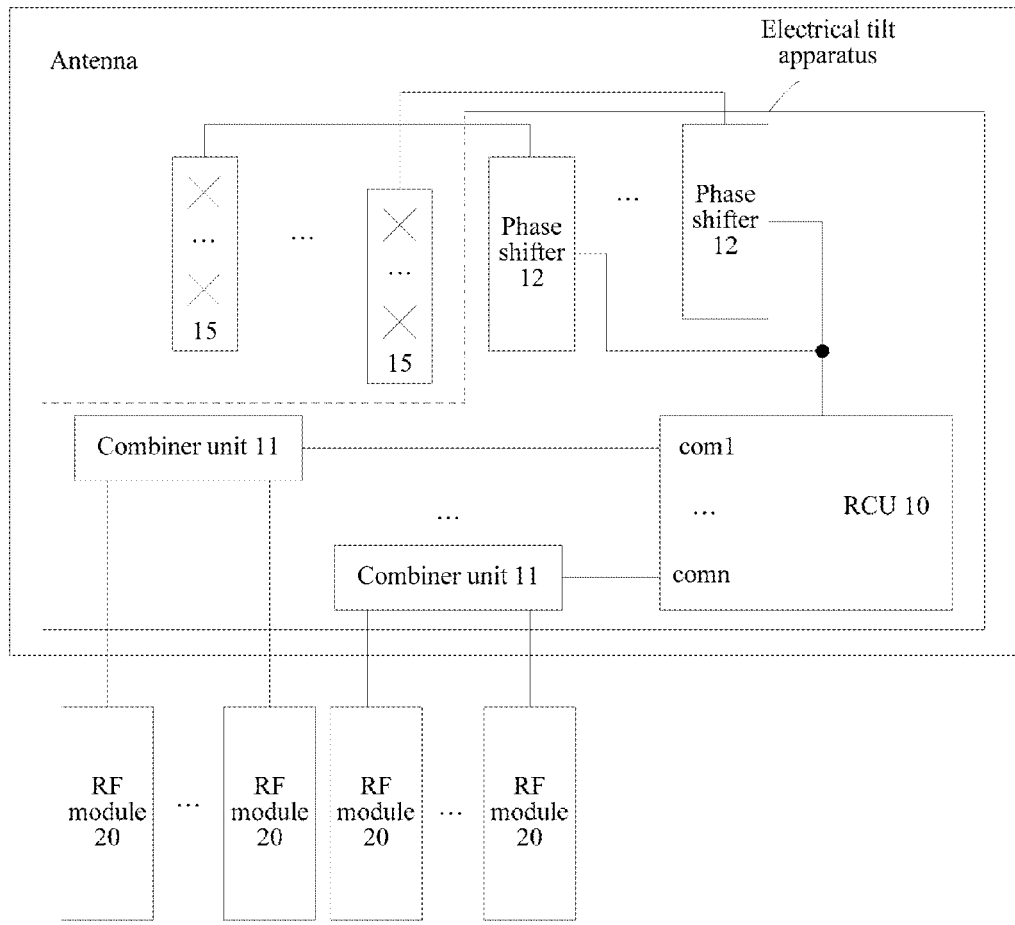

FIG. 7

An electrical tilt apparatus receives, at a time point, an electrical tilt signal sent by one of at least two RF modules, where the at least two RF modules are connected to one serial port on an RCU in the electrical tilt apparatus by using one combiner unit in the electrical tilt apparatus — S101

The electrical tilt apparatus drives, according to the electrical tilt signal, a phase shifter that corresponds to the one RF module to move, to adjust a phase of an RF signal that is input to the phase shifter — S102

FIG. 8

ELECTRICAL TILT APPARATUS, ANTENNA, AND ELECTRICAL TILT METHOD

CROSS-REFERENCE TO RELATED APPLICATION

This application is a continuation of International Application No. PCT/CN2015/079840, filed on May 26, 2015, the disclosure of which is hereby incorporated by reference in its entirety.

TECHNICAL FIELD

The present application relates to the communications field, and in particular, to an electrical tilt apparatus, an antenna, and an electrical tilt method.

BACKGROUND

With rapid development of mobile networks, mobile networks have higher requirements on base station capacities, and a quantity of antennas on a base station is increasing. To reduce the quantity of antennas, an antenna capable of supporting multiple radio frequency (RF) modules (that is, multiple frequency bands) is put forward.

Generally, to perform, on an antenna, independent electrical tilt on RF signals sent by multiple RF modules, an on-off keying (OOK) modulation manner may be used. In this modulation manner, RF modules are respectively connected to corresponding phase shifters and different serial ports on a remote control unit (RCU) in an electrical tilt apparatus by using a bias tee (BT) built in the electrical tilt apparatus, and each of the RF modules sends an independent RF signal+electrical tilt signal (the electrical tilt signal includes an OOK signal and a direct current voltage signal), thereby implementing independent electrical tilt. For example, after receiving an RF signal+an electrical tilt signal sent by an RF module, an electrical tilt apparatus may separate the electrical tilt signal and the RF signal by using a built-in BT, input the RF signal to a phase shifter that corresponds to the RF module, and input the electrical tilt signal to an RCU. Then, the RCU controls, according to the electrical tilt signal, the phase shifter to move, to adjust a phase of the RF signal that is input to the phase shifter, and inputs the RF signal whose phase has been adjusted by using the phase shifter to an antenna element connected to the phase shifter, so that electrical tilt is performed on the RF signal sent by the RF module.

However, in the foregoing scenario in which an electrical tilt apparatus performs independent electrical tilt on RF signals sent by multiple RF modules, because the RF modules need to connect to different serial ports on an RCU in the electrical tilt apparatus, a quantity of the serial ports on the RCU needs to be greater than or equal to a quantity of the RF modules. However, because a quantity of serial ports on an RCU is usually limited (usually three or four) in reality, when a quantity of RF modules exceeds the quantity of the serial ports on the RCU, the electrical tilt apparatus cannot implement independent electrical tilt on RF signals sent by some RF modules.

SUMMARY

Embodiments of the present disclosure provide an electrical tilt apparatus, an antenna, and an electrical tilt method, to ensure that when a quantity of serial ports on an RCU is limited, an electrical tilt apparatus implements independent electrical tilt on RF signals sent by more RF modules.

To achieve the foregoing objective, the following technical solutions are used in the embodiments of the present disclosure.

According to a first aspect, an embodiment of the present disclosure provides an electrical tilt apparatus, including: a remote control unit RCU, and at least one combiner unit and multiple phase shifters that are connected to the RCU, where each of the at least one combiner unit is configured to: connect to a different serial port on the RCU and connect to at least two radio frequency RF modules; receive, at a time point, an electrical tilt signal sent by one of the at least two RF modules, and send the electrical tilt signal to the RCU; and the RCU is configured to: receive the electrical tilt signal sent by each combiner unit, and drive, according to the electrical tilt signal, a first phase shifter that corresponds to a first RF module to move, to adjust a phase of an RF signal that is input to the first phase shifter, where the first RF module is an RF module sending the electrical tilt signal and the RF signal, and the first phase shifter is one of the multiple phase shifters.

In a first possible implementation of the first aspect, each combiner unit includes a direct current power end, an on-off keying OOK output end, an RC circuit connected to the OOK output end, at least two OOK input ends, and at least two combiner modules connected to both the direct current power end and the RC circuit, where the at least two combiner modules are connected to the at least two OOK input ends in a one-to-one correspondence manner; and each of the at least two combiner modules is connected to different RF modules by using one of the at least two OOK input ends, and the direct current power end and the OOK output end are connected to a same serial port on the RCU.

With reference to the first possible implementation of the first aspect, in a second possible implementation, each of the at least two combiner modules includes an inductor, a first capacitor, a second capacitor, a first diode, and a second diode, where one end of the inductor is connected to one of the at least two OOK input ends, the other end of the inductor is connected to one end of the first capacitor, the other end of the first capacitor is grounded, one end of the first capacitor is connected to a positive electrode of the first diode, a negative electrode of the first diode is connected to the direct current power end, a positive electrode of the second diode is connected to the one OOK input end, a negative electrode of the second diode is connected to one end of the second capacitor, and the other end of the second capacitor is connected to the OOK output end by using the RC circuit; and the RC circuit includes a resistor and a third capacitor, one end of the resistor is separately connected to the other end of the second capacitor and one end of the third capacitor, the other end of the resistor is grounded, and the other end of the third capacitor is connected to the OOK output end.

With reference to any one of the first aspect, or the first possible implementation or the second possible implementation of the first aspect, in a third possible implementation, the RCU includes a control module and a drive module connected to the control module, each combiner unit is connected to a different serial port on the control module, and the drive module is connected to the multiple phase shifters, where the control module is configured to: receive the electrical tilt signal sent by each combiner unit, and control, according to the electrical tilt signal, the drive module to drive the first phase shifter to move; and the drive module is configured to drive, under the control of the control module, the first phase shifter to move, to adjust the phase of the RF signal that is input to the first phase shifter.

With reference to any one of the first aspect, or the first possible implementation to the third possible implementation of the first aspect, in a fourth possible implementation, the electrical tilt apparatus further includes multiple bias tees BTs;

each combiner unit is connected to each of the at least two RF modules by using a different BT; and each of the multiple BTs is configured to separate an RF signal and an electrical tilt signal that are sent by an RF module connected to the BT.

With reference to any one of the first aspect, or the first possible implementation to the fourth possible implementation of the first aspect, in a fifth possible implementation, the electrical tilt apparatus further includes at least one interface connected to the RCU; and each of the at least one interface is configured to connect to one RF module.

With reference to the fifth possible implementation of the first aspect, in a sixth possible implementation, each interface is connected to a different serial port on the RCU, and the serial port connected to each combiner unit on the RCU is different from the serial port connected to each interface.

According to a second aspect, an embodiment of the present disclosure provides an antenna, including the electrical tilt apparatus according to the first aspect, and multiple antenna elements connected to each phase shifter in the electrical tilt apparatus.

According to a third aspect, an embodiment of the present disclosure provides an electrical tilt method, applied to the electrical tilt apparatus according to the first aspect, and including:

receiving, by the electrical tilt apparatus at a time point, an electrical tilt signal sent by one of at least two RF modules, where the at least two RF modules are connected to one serial port on a remote control unit RCU in the electrical tilt apparatus by using one combiner unit in the electrical tilt apparatus; and driving, by the electrical tilt apparatus according to the electrical tilt signal, a phase shifter that corresponds to the one RF module to move, to adjust a phase of an RF signal that is input to the phase shifter.

In a first possible implementation of the third aspect, the combiner unit includes a direct current power end, an on-off keying OOK output end, an RC circuit connected to the OOK output end, at least two OOK input ends, and at least two combiner modules connected to both the direct current power end and the RC circuit, where the at least two combiner modules are connected to the at least two OOK input ends in a one-to-one correspondence manner; and each of the at least two combiner modules is connected to different RF modules by using one of the at least two OOK input ends, and the direct current power end and the OOK output end are connected to a same serial port on the RCU.

With reference to the first possible implementation of the third aspect, in a second possible implementation, each of the at least two combiner modules includes an inductor, a first capacitor, a second capacitor, a first diode, and a second diode, where one end of the inductor is connected to one of the at least two OOK input ends, the other end of the inductor is connected to one end of the first capacitor, the other end of the first capacitor is grounded, one end of the first capacitor is connected to a positive electrode of the first diode, a negative electrode of the first diode is connected to the direct current power end, a positive electrode of the second diode is connected to the one OOK input end, a negative electrode of the second diode is connected to one end of the second capacitor, and the other end of the second capacitor is connected to the OOK output end by using the RC circuit; and the RC circuit includes a resistor and a third capacitor, one end of the resistor is separately connected to the other end of the second capacitor and one end of the third capacitor, the other end of the resistor is grounded, and the other end of the third capacitor is connected to the OOK output end.

In the electrical tilt apparatus, the antenna, and the electrical tilt method that are provided in the embodiments of the present disclosure, the electrical tilt apparatus includes the RCU, and at least one combiner unit and multiple phase shifters that are connected to the RCU. Each of the at least one combiner unit is configured to: connect to a different serial port on the RCU and connect to at least two RF modules; receive, at a time point, an electrical tilt signal sent by one of the at least two RF modules, and send the electrical tilt signal to the RCU. The RCU is configured to: receive the electrical tilt signal sent by each combiner unit, and drive, according to the electrical tilt signal, a first phase shifter that corresponds to a first RF module to move, to adjust a phase of an RF signal that is input to the first phase shifter. The first RF module is an RF module sending the electrical tilt signal and the RF signal. The first phase shifter is one of the multiple phase shifters.

Based on the foregoing technical solutions, the combiner unit is disposed in the electrical tilt apparatus provided in the embodiments of the present disclosure. Each combiner unit is connected to a different serial port on the RCU and connected to at least two RF modules, and each combiner unit receives, at a time point, only an electrical tilt signal sent by one of the at least two RF modules connected to the combiner unit, and performs, according to the electrical tilt signal, electrical tilt on an RF signal sent by the RF module. Therefore, in the embodiments of the present disclosure, more RF modules may be connected by using the combiner unit, thereby ensuring that when a quantity of serial ports on the RCU is limited, the electrical tilt apparatus implements independent electrical tilt on RF signals sent by more RF modules.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure.

FIG. 7 is a schematic structural diagram of an antenna according to an embodiment of the present disclosure;

FIG. 8 is a schematic flowchart of an electrical tilt method according to an embodiment of the present disclosure.

DETAILED DESCRIPTION

The following describes the technical solutions in the embodiments of the present disclosure with reference to the accompanying drawings in the embodiments of the present disclosure. Apparently, the described embodiments are merely some but not all of the embodiments of the present disclosure.

The embodiments of the present disclosure provide an electrical tilt apparatus, an antenna, and an electrical tilt method that may be applied to a scenario in which electrical tilt is performed on an RF signal sent by an RF module. Electrical tilt is performed on an RF signal sent by an RF module, and is specifically: A phase of an RF signal that is input to each antenna element is adjusted, to change a radiation pattern tilt of an antenna (the radiation pattern tilt of the antenna may also be referred to as an electrical tilt of the antenna). The RF signal on which electrical tilt has been performed is then directed and amplified by the antenna elements, to increase a signal strength of the RF signal received by the antenna.

The following describes, with reference to the accompanying drawings, the electrical tilt apparatus, the antenna, and the electrical tilt method that are provided in the embodiments of the present disclosure.

Figure 1:
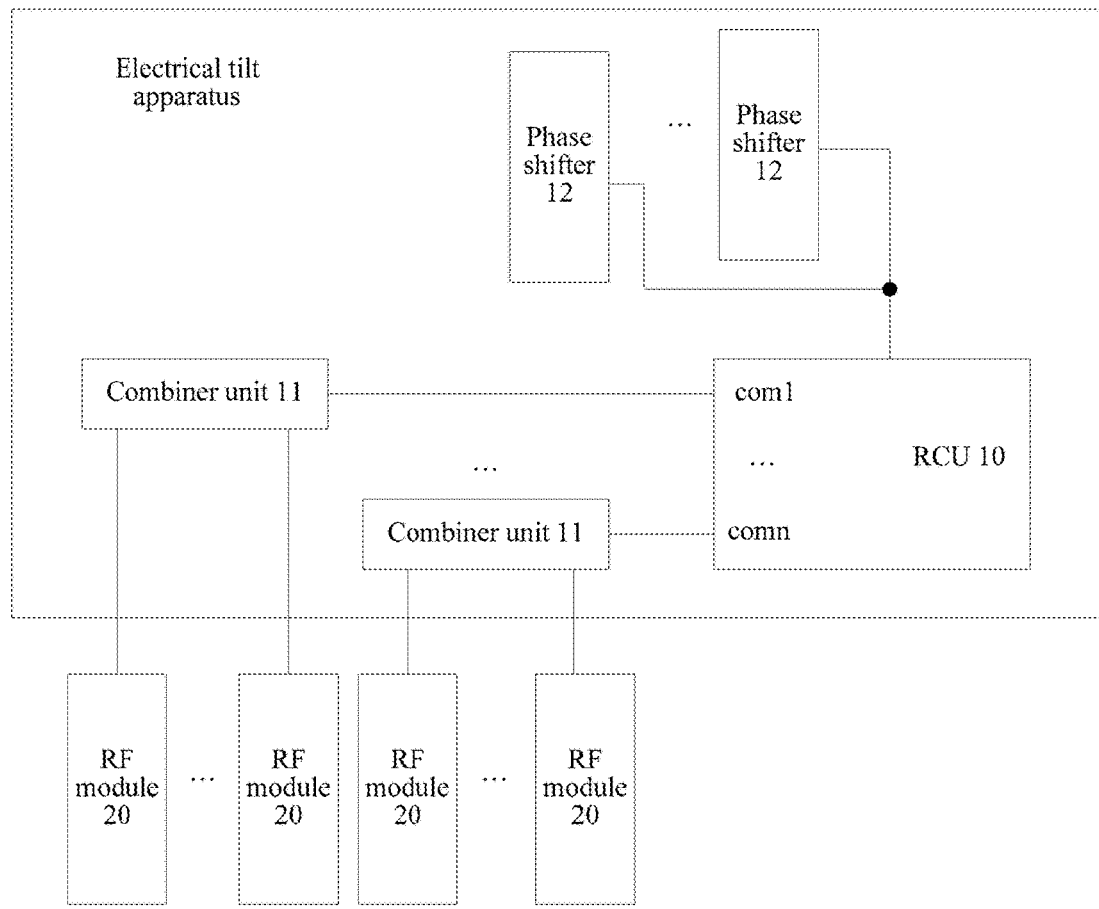
FIG. 1 is a first schematic structural diagram of an electrical tilt apparatus according to an embodiment of the present disclosure.

As shown in FIG. 1, an embodiment of the present disclosure provides an electrical tilt apparatus. The electrical tilt apparatus may include: an RCU 10, and at least one combiner unit 11 and multiple phase shifters 12 that are connected to the RCU 10.

Each of the at least one combiner unit 11 is configured to: connect to a different serial port (which, for example, may be marked as com 1, . . . , or com n, and n is a positive integer) on the RCU 10 and connect to at least two radio frequency RF modules 20; receive, at a time point, an electrical tilt signal sent by one of the at least two RF modules 20, and send the electrical tilt signal to the RCU 10.

The RCU 10 is configured to: receive the electrical tilt signal sent by each combiner unit, and drive, according to the electrical tilt signal, a first phase shifter that corresponds to a first RF module to move, to adjust a phase of an RF signal that is input to the first phase shifter. The first RF module is an RF module sending the electrical tilt signal and the RF signal. The first phase shifter is one of the multiple phase shifters 12.

It should be noted that "multiple" used in this embodiment of the present disclosure refers to two or more. For example, multiple phase shifters are two or more phase shifters.

In the electrical tilt apparatus provided in this embodiment of the present disclosure, at least two RF modules are connected to one serial port on the RCU by using one combiner unit, thereby ensuring that when a quantity of serial ports on the RCU is limited, the electrical tilt apparatus implements independent electrical tilt on RF signals sent by more RF modules.

Further, in the electrical tilt apparatus provided in this embodiment of the present disclosure, each combiner unit is connected to a different serial port on the RCU, and each combiner unit is connected to multiple RF modules, thereby ensuring that when a quantity of serial ports on the RCU is limited, the electrical tilt apparatus implements independent electrical tilt on RF signals sent by more RF modules.

A person skilled in the art may understand that for multiple RF modules (which may be understood as RF devices) of a same vendor and served by a same base station, regardless of whether the RF modules share a baseband unit (BBU) of the base station, the electrical tilt apparatus sequentially performs electrical tilt on RF signals sent by the RF modules. That is, the electrical tilt apparatus does not simultaneously perform electrical tilt on RF signals sent by two or more RF modules. Therefore, the electrical tilt apparatus provided in this embodiment of the present disclosure may use a combiner unit to combine multiple different RF modules of a same vendor, so that one serial port on the RCU may control RF signals sent by multiple different RF modules, thereby implementing independent electrical tilt. In this way, it can be ensured that when a quantity of serial ports on the RCU is limited, the electrical tilt apparatus implements independent electrical tilt on RF signals sent by more RF modules.

During actual application of the electrical tilt apparatus provided in this embodiment of the present disclosure, if multiple RF modules of a same vendor are connected to a same BBU, because the BBU can be controlled manually by means of background software to deliver an electrical tilt command, that is, the BBU can deliver, at a time point, an electrical tilt command of performing electrical tilt on only an RF signal sent by one RF module, electrical tilt can be performed on only an RF signal sent by one RF module each time, thereby, ensuring that the electrical tilt apparatus implements independent electrical tilt on RF signals sent by multiple RF modules. If the multiple RF modules of the same vendor are connected to multiple BBUs, regardless of whether these BBUs are maintained by a same maintenance group or different maintenance groups, because the maintenance groups for maintaining the multiple BBUs can control, through negotiation and the like, the multiple BBUs to sequentially deliver electrical tilt commands, that is, at a time point, only one BBU can deliver an electrical tilt command of performing electrical tilt on an RF signal sent by an RF module connected to the BBU, electrical tilt can be performed each time on only an RF signal sent by one RF module, and the electrical tilt apparatus implements independent electrical tilt on RF signals sent by multiple RF modules.

Further, if the electrical tilt apparatus needs to perform independent electrical tilt on RF signals sent by multiple RF modules of different vendors, the multiple RF modules of the different vendors may connect to different serial ports respectively by using different combiner units, and manual control by means of background software is used to ensure that the RCU does not simultaneously receive two electrical tilt signals from one serial port. In this way, the electrical tilt apparatus can conveniently implement independent electrical tilt on the RF signals sent by the multiple RF modules of the different vendors.

During actual application, optionally, when the electrical tilt apparatus performs independent electrical tilt on RF signals sent by multiple RF modules of different vendors, even if the RCU simultaneously receives electrical tilt signals sent by two RF modules, the RCU may delay processing one of the electrical tilt signals, and does not process the electrical tilt signal until completing processing the other electrical tilt signal.

By using the electrical tilt apparatus provided in this embodiment of the present disclosure, when a quantity of serial ports on an RCU is limited, independent electrical tilt can be performed not only on RF signals sent by more RF modules of a same vendor, but also on RF signals sent by more RF modules of different vendors. Independent electrical tilt is performed on RF signals sent by RF modules, so that reliability and flexibility of the RF modules can be better ensured.

It should be noted that, an electrical tilt manner used by the electrical tilt apparatus provided in this embodiment of the present disclosure may be an OOK modulation manner. The OOK modulation manner is as follows. Each RF module sends an independent signal. The signal includes an RF signal and an electrical tilt signal. The electrical tilt signal includes an OOK signal and a direct current voltage signal. After receiving a signal sent by an RF module, the electrical tilt apparatus separates an RF signal and an electrical tilt signal by using a BT built in the electrical tilt apparatus, inputs the RF signal to a phase shifter that corresponds to the RF module sending the signal, and inputs the electrical tilt signal to an RCU. Then, the RCU drives, according to the electrical tilt signal, the phase shifter to move, to adjust a phase of the RF signal that is input to the phase shifter, and inputs the RF signal whose phase has been adjusted by using the phase shifter to multiple antenna elements connected to the phase shifter, so that electrical tilt is performed on the RF signal sent by the RF module. The OOK signal is a modulation signal of the RF signal, and the OOK signal is used by the RCU to perform electrical tilt on the RF signal sent by the RF module. The direct current voltage signal is used to supply power to the RCU.

It should be noted that "multiple" used in this embodiment of the present disclosure refers to two or more. For example, multiple antenna elements are two or more antenna elements.

Optionally, the RF modules provided in this embodiment of the present disclosure may be remote radio units (RRU).

Figure 2:
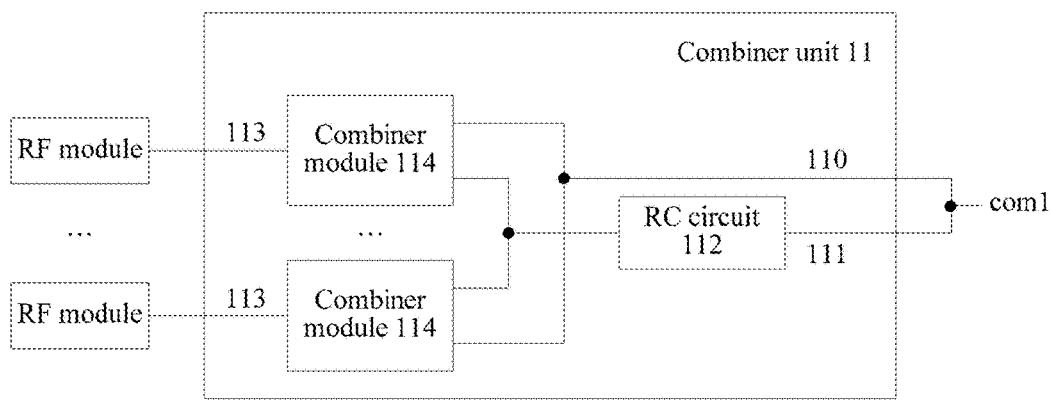
FIG. 2 is a schematic structural diagram of a combiner unit according to an embodiment of the present disclosure.

Optionally, as shown in FIG. 2, each of the at least one combiner unit 11 provided in this embodiment of the present disclosure may include a direct current power end 110, an OOK output end 111, a resistance-capacitance unit (RC circuit) 112 connected to the OOK output end 111, at least two OOK input ends 113, and at least two combiner modules 114 connected to both the direct current power end 110 and the RC circuit 112. The at least two combiner modules 114 are connected to the at least two OOK input ends 113 in a one-to-one correspondence manner. The at least two combiner modules are respectively connected to different RF modules by using one of the at least two OOK input ends 113. The direct current power end 110 and the OOK output end 111 are connected to one serial port (for example, serial port 1, which is marked as com 1) on the RCU 10.

The direct current power end 110 is configured to output a direct current voltage signal in an electrical tilt signal. The OOK output end 111 is configured to output an OOK signal in the electrical tilt signal. The RC circuit 112 is a filtering circuit configured to filter OOK signals output from the at least two combiner modules. The at least two OOK input ends 113 are configured to input OOK signals sent by corresponding RF modules and separated by using BTs.

In the electrical tilt apparatus provided in this embodiment of the present disclosure, each combiner module is configured to send, to the RCU, an electrical tilt signal sent by an RF module connected to the combiner module. A combiner unit including at least two combiner modules is configured to combine different RF modules, so that the electrical tilt apparatus performs independent electrical tilt on RF signals sent by different RF modules sharing one serial port on the RCU. One combiner unit can receive, at a same time point, only an electrical tilt signal sent by an RF module connected to one combiner module in the combiner unit.

Figure 3:
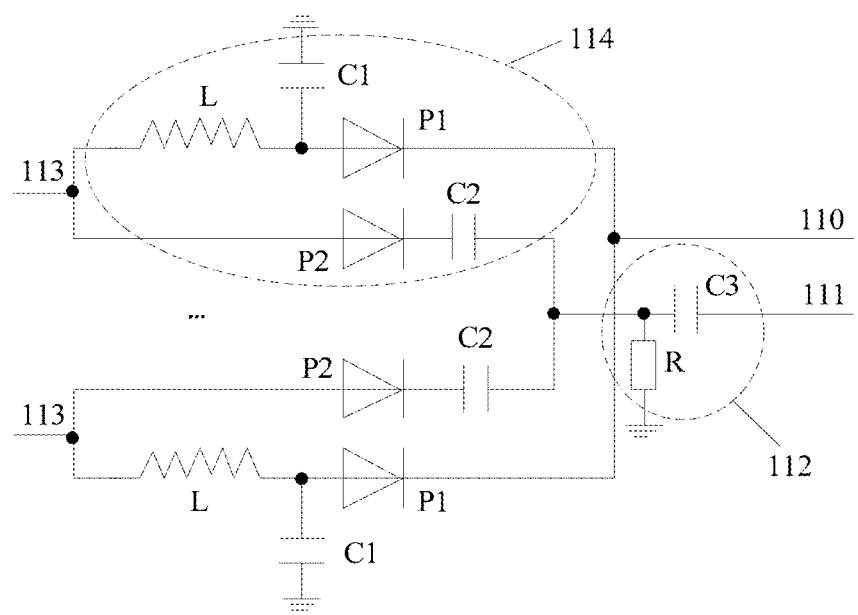
FIG. 3 is a schematic structural diagram of a combiner module according to an embodiment of the present disclosure.

Optionally, as shown in FIG. 3, each of the at least two combiner modules 114 may include an inductor L, a first capacitor C1, a second capacitor C2, a first diode P1, and a second diode P2.

One end of the inductor L is connected to one of the at least two OOK input ends 113, the other end of the inductor L is connected to one end of the first capacitor C1, the other end of the first capacitor C1 is grounded, one end of the first capacitor C1 is connected to a positive electrode of the first diode P1, a negative electrode of the first diode P1 is connected to the direct current power end 110, a positive electrode of the second diode P2 is connected to the one OOK input end, a negative electrode of the second diode P2 is connected to one end of the second capacitor C2, and the other end of the second capacitor C2 is connected to the OOK output end 111 by using the RC circuit 112.

The RC circuit 112 includes a resistor R and a third capacitor C3. One end of the resistor R is separately connected to the other end of the second capacitor C2 and one end of the third capacitor C3, the other end of the resistor R is grounded, and the other end of the third capacitor C3 is connected to the OOK output end 111.

It should be noted that, the combiner modules provided in this embodiment of the present disclosure and shown in FIG. 3 is merely an example for describing this embodiment of the present disclosure. That is, this embodiment of the present disclosure includes but is not limited to the combiner unit shown in FIG. 3. Specifically, corresponding changes may be made based on the combiner unit shown in FIG. 3 and according to an actual usage requirement. This is not specifically limited in the present disclosure. Any unit/module/circuit and the like that can implement functions the same as or similar to those of the combiner modules provided in this embodiment of the present disclosure for combining different RF modules shall fall within the protection scope of the present disclosure.

For example, because circuit structures of the combiner modules provided in this embodiment of the present disclosure and values of each element in the circuit structures are different as specifically used antennas are different, for example, frequency bands used by electrical tilt apparatuses in different antennas to perform electrical tilt are different, circuit structures of combiner modules may need to be adjusted based on the combiner modules shown in FIG. 3. Therefore, any simple replacement/addition/reduction and the like of some elements made by a person skilled in the art based on the combiner modules shown in FIG. 3 shall fall within the protection scope of the present disclosure.

Figure 4:
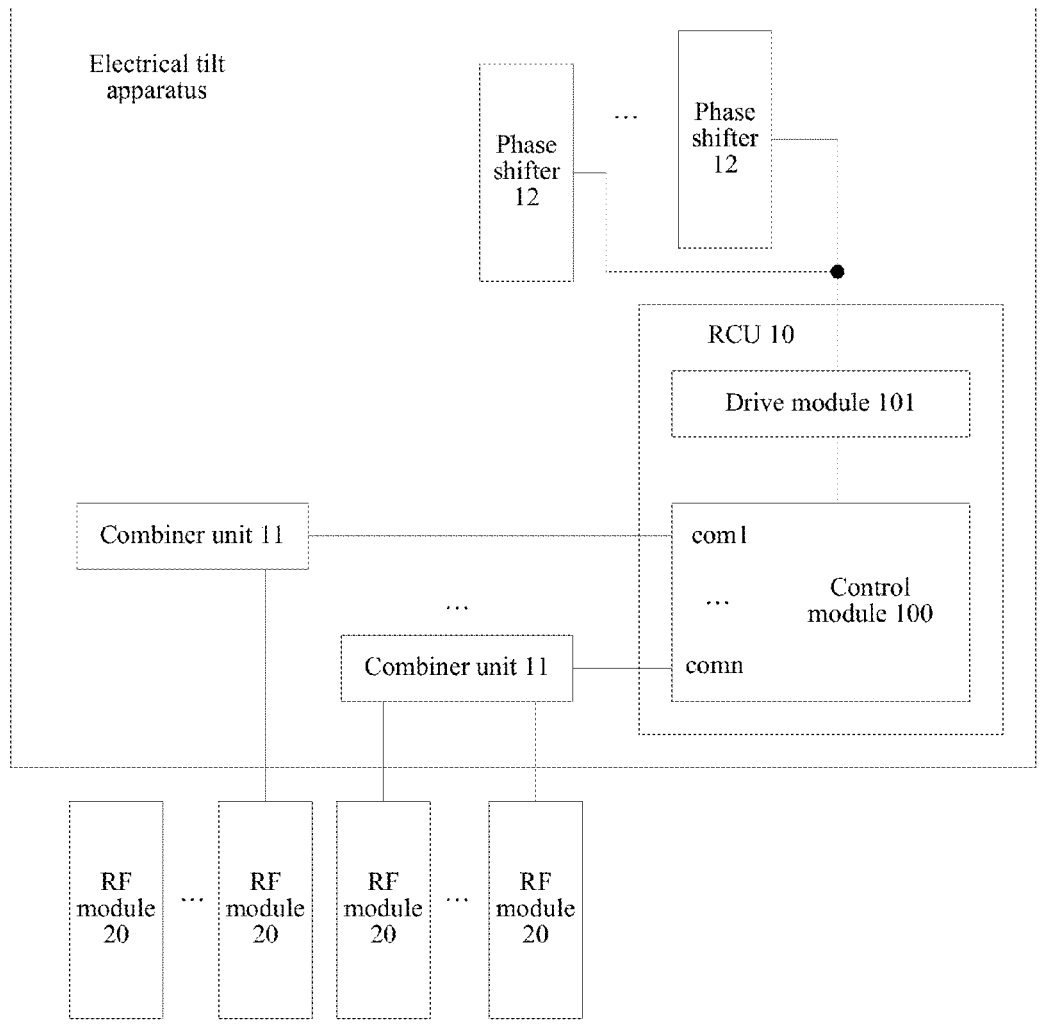
FIG. 4 is a second schematic structural diagram of an electrical tilt apparatus according to an embodiment of the present disclosure.

Optionally, with reference to FIG. 1, as shown in FIG. 4, the RCU 10 provided in this embodiment of the present disclosure may include a control module 100 and a drive module 101 connected to the control module 100. Each combiner unit is connected to a different serial port on the control module 100. The drive module 101 is connected to the multiple phase shifters 12.

The control module 100 is configured to: receive the electrical tilt signal sent by each combiner unit, and control, according to the electrical tilt signal, the drive module 101 to drive the first phase shifter to move. The drive module 101 is configured to drive, under the control of the control module 100, the first phase shifter to move, to adjust a phase of an RF signal that is input to the first phase shifter.

Specifically, the control module in this embodiment of the present disclosure may be implemented by using an element having a control function, such as a controller or a control chip. Specifically, the control module may be designed according to an actual usage requirement, and this is not limited in the present disclosure.

Optionally, the drive module in this embodiment of the present disclosure may be implemented in a form of a motor and an electric machine. After receiving an electrical tilt signal, the control module may control, under an action of a direct current voltage signal in the electrical tilt signal, the electric machine to work (and may specifically control the electric machine to work by controlling a rotation speed of the electric machine), so that the electric machine drives the motor to rotate, the motor drives a phase shifter to move, to adjust a phase of an RF signal that is input to the phase shifter, and input the RF signal whose phase has been adjusted by using the phase shifter to multiple antenna elements connected to the phase shifter, and further, the electrical tilt apparatus implements electrical tilt on the RF signal sent by the RF module.

The drive module in this embodiment of the present disclosure may be integrated into the control module, or may be separated from the control module. A specific implementation may be designed according to an actual usage requirement, and is not limited in the present disclosure.

Figure 5:
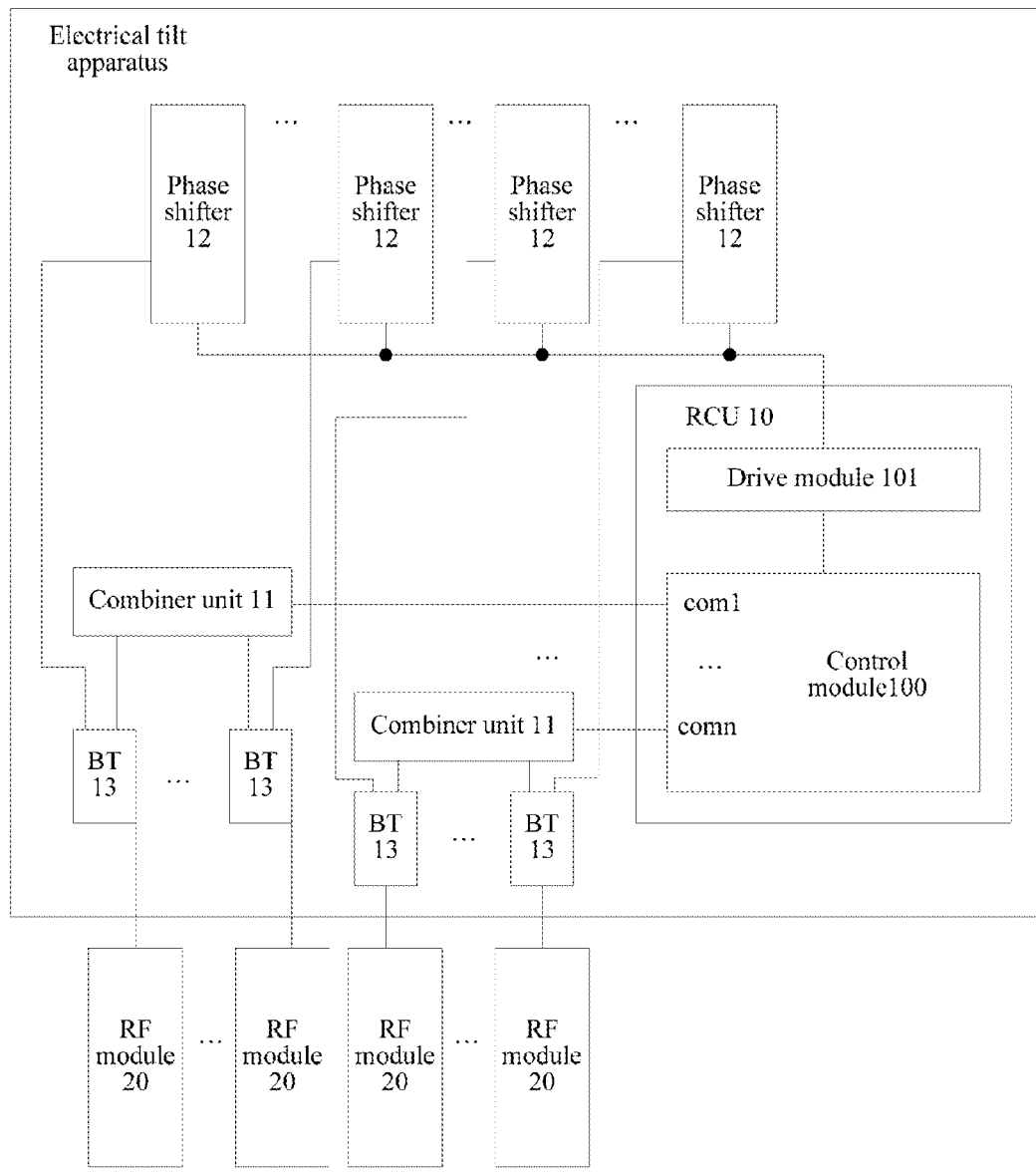
FIG. 5 is a third schematic structural diagram of an electrical tilt apparatus according to an embodiment of the present disclosure.

Optionally, with reference to FIG. 4, as shown in FIG. 5, the electrical tilt apparatus provided in this embodiment of the present disclosure may further include multiple BTs 13.

Each combiner unit is connected to each of the at least two RF modules 20 by using a different BT. Each of the multiple BTs 13 is configured to separate an RF signal and an electrical tilt signal that are sent by an RF module connected to the BT.

In this embodiment of the present disclosure, each combiner unit is connected to a different RF module by using a different BT, so that it can be ensured that electrical tilt signals sent by different RF modules independently enter the combiner unit, thereby preventing crosstalk caused by a fact that the electrical tilt signals sent by the different RF modules enter the combiner unit simultaneously.

It should be noted that, using the OOK modulation manner as an example, when a signal sent by an RF module (including an RF signal and an electrical tilt signal, where the electrical tilt signal includes an OOK signal and a direct current voltage signal) passes through a BT, the BT divides the RF signal and the electrical tilt signal into two paths, inputs the RF signal to a phase shifter that corresponds to the RF module, and inputs the electrical tilt signal to an RCU by using a combiner unit, so that the RCU may drive, according to the electrical tilt signal, the phase shifter to move, to adjust a phase of the RF signal that is input to the phase shifter, and input the RF signal whose phase has been adjusted by using the phase shifter to multiple antenna elements connected to the phase shifter, so that the electrical tilt apparatus implements electrical tilt on the RF signal sent by the RF module.

Further, after the signal sent by the RF module passes through the BT, the BT inputs the OOK signal and the direct current voltage signal to the RCU by using the combiner unit. The direct current voltage signal is used to supply power to the RCU, to ensure that the RCU can process the OOK signal at the same time when the OOK signal is input to the RCU.

Figure 6:
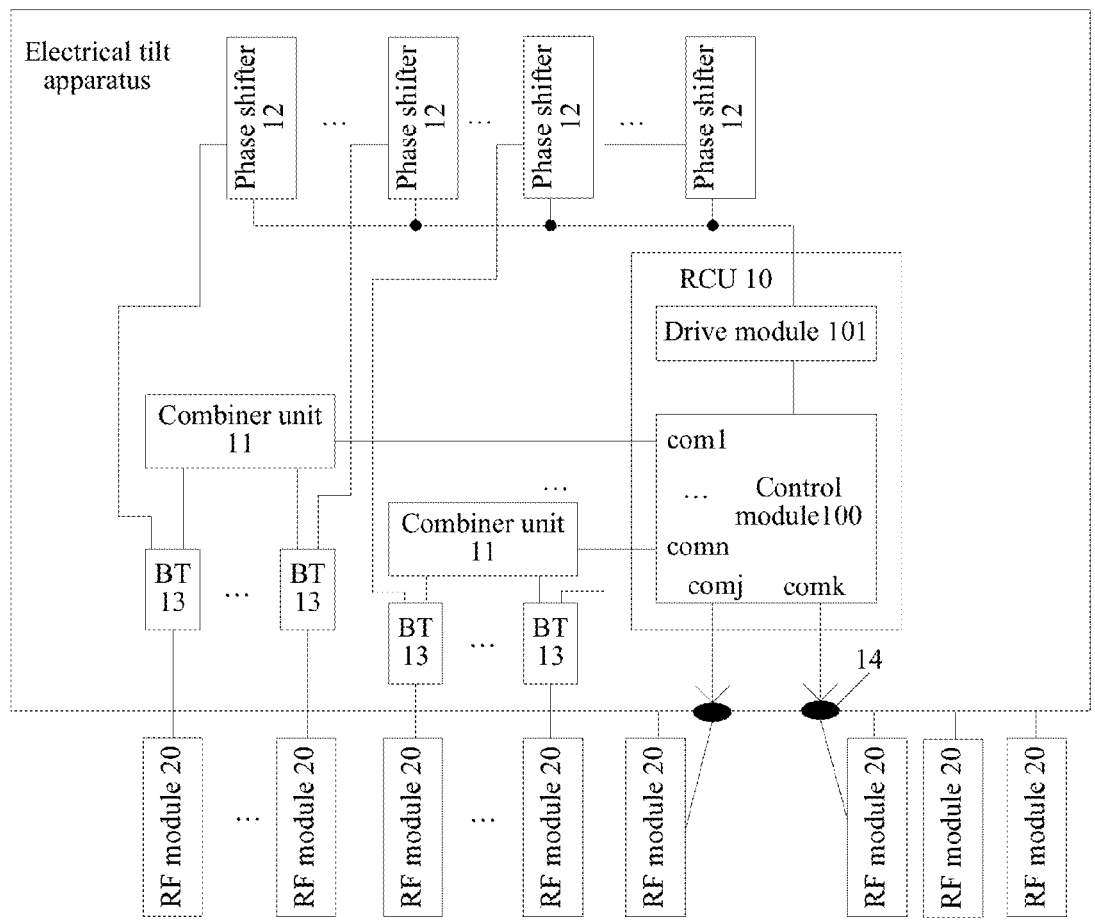
FIG. 6 is a fourth schematic structural diagram of an electrical tilt apparatus according to an embodiment of the present disclosure.

Optionally, with reference to FIG. 5, as shown in FIG. 6, the electrical tilt apparatus provided in this embodiment of the present disclosure may further include at least one interface 14 connected to the RCU 10.

Each of the at least one interface 14 is configured to connect to one RF module.

Optionally, as shown in FIG. 6, each interface is connected to a different serial port on the RCU 10, and the serial port connected to each combiner unit on the RCU is different from the serial port connected to each interface. Specifically, each interface is connected to a different serial port on the control module 100 in the RCU 10 (for example, com k or com j, where k and j are positive integers different from n).

In this embodiment of the present disclosure, an electrical tilt manner used by the electrical tilt apparatus provided in this embodiment of the present disclosure may further include a modulation manner. When the electrical tilt apparatus uses the modulation manner to perform electrical tilt on RF signals sent by different RF modules 20 (as shown in FIG. 6, these RF modules 20 include the RF module 20 connected to the interface and the RF module 20 not connected to the interface), the RF module 20 connected to the interface sends an electrical tilt signal to the RCU. After receiving the electrical tilt signal, the RCU drives a phase shifter that corresponds to the RF module 20 sending the RF signal on which electrical tilt needs to be performed, to move, to adjust a phase of the RF signal that is input to the phase shifter, and inputs the RF signal whose phase has been adjusted by using the phase shifter to multiple antenna elements connected to the phase shifter, so that electrical tilt is performed on the RF signal that is sent by the RF module 20 and on which electrical tilt needs to be performed.

As shown in FIG. 6, the RF module 20 not connected to the interface may send an electrical tilt signal by using the RF module 20 connected to the interface. Specifically, when multiple interfaces are disposed on the electrical tilt apparatus, the RF module 20 not connected to the interface may send the electrical tilt signal by using the RF module connected to the interface, by means of predefining according to an actual usage requirement, so that electrical tilt is performed on an RF signal sent by the RF module 20 not connected to the interface.

Optionally, an electrical tilt signal in this embodiment of the present disclosure may be an electrical tilt signal in the OOK modulation manner (for example, may be an OOK signal+a direct current voltage signal), or may be an electrical tilt signal in the modulation manner. Specifically, when the OOK modulation manner is used, the electrical tilt signal in this embodiment of the present disclosure is the electrical tilt signal in the OOK modulation manner, and when the modulation manner is used, the electrical tilt signal in this embodiment of the present disclosure is the electrical tilt signal in the modulation manner.

In this embodiment of the present disclosure, when electrical tilt needs to be performed on RF signals sent by RF modules of different vendors, different modulation manners may be used to perform electrical tilt on the RF signals. For example, the OOK modulation manner may be used to perform electrical tilt on RF signals sent by RF modules of some vendors, and the modulation manner may be used to perform electrical tilt on RF signals sent by RF modules of other vendors. A specific modulation manner used to perform electrical tilt on RF signals sent by RF modules of different vendors may be selected according to an actual requirement, and this is not specifically limited in the present disclosure.

To better understand the implementations provided in this embodiment of the present disclosure, the following describes, in detail with reference to FIG. 2, FIG. 3, and FIG. 5, a working principle of the combiner unit provided in this embodiment of the present disclosure.

In the combiner unit provided in this embodiment of the present disclosure, a signal (including an RF signal and an electrical tilt signal) output from an RF module is separated by using a BT, and then an OOK signal in the electrical tilt signal and a direct current voltage signal in the electrical tilt signal are divided into two paths and input to an RCU, to ensure that when the direct current voltage signal normally supplies power to the RCU, the RCU can drive, according to the OOK signal, a phase shifter that corresponds to the RF module sending the OOK signal to move, to adjust a phase of an RF signal that is input to the phase shifter, and input the RF signal whose phase has been adjusted by using the phase shifter to multiple antenna elements connected to the phase shifter, so that the electrical tilt apparatus can implement electrical tilt on the RF signal sent by the RF module.

As shown in FIG. 2, FIG. 3 and FIG. 5, after the OOK signal and the direct current voltage signal that pass through the BT enter a combiner module in the combiner unit, an LC low-pass filter including an inductor L and a first capacitor C1 in the combiner module blocks the OOK signal having a relatively high frequency (the frequency of the OOK signal usually is 2.176 megahertz), and outputs the direct current voltage signal. After being rectified by a first diode P1, the direct current voltage signal is output to a serial port on the RCU 10 by using the direct current power end 110 of the combiner unit, to supply power to the RCU 10. Because the direct current voltage signal is imposed on the second diode P2 in the combiner module, the second diode P2 is on, so that the OOK signal is output from an OOK output end 111 to a serial port on the RCU 10 after passing through the second diode P2, the second capacitor C2, and the RC circuit 112. The second capacitor C2 is configured to block the direct current voltage signal, and output the alternating-current OOK signal. The RC circuit 112 is configured to filter the OOK signal passing through the second capacitor C2. In this way, when the direct current voltage signal supplies power to the RCU 10, the RCU 10 drives, according to the OOK signal, a phase shifter that corresponds to the RF module sending the OOK signal to move, to adjust a phase of an RF signal that is input to the phase shifter, and sends the RF signal whose phase has been adjusted by using the phase shifter to multiple antenna elements connected to the phase shifter, so that the electrical tilt apparatus implements electrical tilt on the RF signal sent by the RF module.

In the circuit shown in FIG. 3, when an OOK signal and a direct current voltage signal pass through the second diode P2, the direct current voltage signal enables the second diode P2 to be on. When the OOK signal and the direct current voltage signal pass through the second capacitor C2 that follows the second diode P2, because the second capacitor C2 blocks a direct current signal and outputs an alternating current signal, the direct current voltage signal is blocked by the second capacitor C2, and only the alternating-current OOK signal passes through the second capacitor C2 and is output from the OOK output end to the RCU 10 after being filtered by the RC circuit including the resistor and the third capacitor C3.

In this embodiment of the present disclosure, because an OOK power supply providing the foregoing direct current voltage signal in the RF module is in a turned-off state by default, the OOK power supply needs to be turned on by means of manual control. That is, the OOK power supply can be turned on only when a BBU is manually controlled to deliver an electrical tilt command. Therefore, direct current voltage signals usually are not simultaneously input to two or more combiner modules in a combiner unit. That is, two or more combiner modules in a combiner unit usually do not work simultaneously. When one combiner module works, a first diode P1 and a second diode P2 in another combiner module that forms a combiner unit together with the combiner module are both in a turned-off state, thereby avoiding a signal backflow phenomenon caused by a fact that a direct current voltage signal and an OOK signal entering the combiner module enter the another combiner module.

In particular, when two or more combiner modules in a combiner unit work simultaneously due to a misoperation, an RF module may detect currents on the combiner modules, and give an alarm when detecting that currents on some combiner modules are less than a preset threshold, to detect the misoperation in time and avoid a problem caused by the misoperation.

It should be noted that, in this embodiment of the present disclosure, a quantity of combiner units, a quantity of combiner modules, a quantity of interfaces, and a quantity of serial ports on an RCU in FIG. 1 to FIG. 6 are all merely examples for better describing the electrical tilt apparatus provided in this embodiment of the present disclosure and the working principle of electrical tilt by the electrical tilt apparatus, and are not intended to specifically limit this embodiment of the present disclosure. That is, the quantity of combiner units, the quantity of combiner modules, the quantity of interfaces, and the quantity of serial ports on an RCU described in FIG. 1 to FIG. 6 are not limited to the quantities shown in FIG. 1 to FIG. 6, and may be more.

In the electrical tilt apparatus provided in this embodiment of the present disclosure, the electrical tilt apparatus includes the RCU, and at least one combiner unit and multiple phase shifters that are connected to the RCU. Each of the at least one combiner unit is configured to: connect to a different serial port on the RCU and connect to at least two RF modules; receive, at a time point, an electrical tilt signal sent by one of the at least two RF modules, and send the electrical tilt signal to the RCU. The RCU is configured to: receive the electrical tilt signal sent by each combiner unit, and drive, according to the electrical tilt signal, a first phase shifter that corresponds to a first RF module to move, to adjust a phase of an RF signal that is input to the first phase shifter. The first RF module is an RF module sending the electrical tilt signal and the RF signal. The first phase shifter is one of the multiple phase shifters.

Based on the foregoing technical solutions, the combiner unit is disposed in the electrical tilt apparatus provided in this embodiment of the present disclosure. Each combiner unit is connected to a different serial port on the RCU and connected to at least two RF modules, and each combiner unit receives, at a time point, only an electrical tilt signal sent by one of the at least two RF modules connected to the combiner unit, and performs, according to the electrical tilt signal, electrical tilt on an RF signal sent by the RF module.

Therefore, in this embodiment of the present disclosure, more RF modules may be connected by using the combiner unit, thereby ensuring that when a quantity of serial ports on the RCU is limited, the electrical tilt apparatus implements independent electrical tilt on RF signals sent by more RF modules.

As shown in FIG. 7, an embodiment of the present disclosure provides an antenna. The antenna includes the electrical tilt apparatus described in any one of FIG. 1 to FIG. 6, and multiple antenna elements 15 connected to each phase shifter 12 in the electrical tilt apparatus.

The electrical tilt apparatus is configured to: receive an electrical tilt signal sent by an RF module, drive, according to the electrical tilt signal, a phase shifter that corresponds to the RF module to move, to adjust a phase of an RF signal that is input to the phase shifter, and send the RF signal whose phase has been adjusted by using the phase shifter to multiple antenna elements connected to the phase shifter.

The multiple antenna elements are configured to: receive the RF signal that is output from the electrical tilt apparatus and whose phase has been adjusted by using the phase shifter, and direct and amplify the RF signal whose phase has been adjusted by using the phase shifter, to increase a signal strength of the RF signal received by the antenna.

It should be noted that a structure of the antenna shown in FIG. 7 is described merely by using a structure of the electrical tilt apparatus in FIG. 1 as an example. Specifically, the structure of the electrical tilt apparatus in the antenna provided in this embodiment of the present disclosure may further be a structure of the electrical tilt apparatus described in any one of FIG. 2 to FIG. 6.

Specifically, for the structure and a working principle of the electrical tilt apparatus in the antenna provided in this embodiment of the present disclosure, refer to related descriptions of the structure and the working principle of the electrical tilt apparatus shown in FIG. 1 to FIG. 6 in the foregoing embodiments, and details are not described herein again.

In the antenna provided in this embodiment of the present disclosure, a combiner unit is disposed in the electrical tilt apparatus in the antenna. Each combiner unit is connected to a different serial port on an RCU and connected to at least two RF modules, and each combiner unit receives, at a time point, only an electrical tilt signal sent by one of the at least two RF modules connected to the combiner unit, and performs, according to the electrical tilt signal, electrical tilt on an RF signal sent by the RF module. Therefore, in this embodiment of the present disclosure, more RF modules may be connected by using the combiner unit, thereby ensuring that when a quantity of serial ports on the RCU is limited, the electrical tilt apparatus in the antenna implements independent electrical tilt on RF signals sent by more RF modules.

As shown in FIG. 8, an embodiment of the present disclosure provides an electrical tilt method, applied to the electrical tilt apparatus described in any one of FIG. 1 to FIG. 6. The electrical tilt method may include:

S101: The electrical tilt apparatus receives, at a time point, an electrical tilt signal sent by one of at least two RF modules, where the at least two RF modules are connected to one serial port on an RCU in the electrical tilt apparatus by using one combiner unit in the electrical tilt apparatus.

S102: The electrical tilt apparatus drives, according to the electrical tilt signal, a phase shifter that corresponds to the one RF module to move, to adjust a phase of an RF signal that is input to the phase shifter.

In this embodiment of the present disclosure, the electrical tilt apparatus includes at least one combiner unit. Each combiner unit is connected to a different serial port on the RCU and connected to at least two RF modules. Because the electrical tilt apparatus performs independent electrical tilt on an RF signal sent by each RF module, the electrical tilt apparatus can receive, at a time point, only an electrical tilt signal sent by one RF module, drive, according to the electrical tilt signal, a phase shifter that corresponds to the RF module, to adjust a phase of an RF signal that is input to the phase shifter, and input the RF signal whose phase has been adjusted by using the phase shifter to multiple antenna elements connected to the phase shifter in the antenna, so that the electrical tilt apparatus implements electrical tilt on the RF signal sent by the RF module.

Specifically, for a structure and a working principle of the electrical tilt apparatus provided in this embodiment of the present disclosure, refer to related descriptions of the structure and the working principle of the electrical tilt apparatus shown in FIG. 1 to FIG. 6 in the foregoing embodiments, and details are not described herein again.

Optionally, as shown in FIG. 2, the combiner unit provided in this embodiment of the present disclosure may include the direct current power end 110, the OOK output end 111, the RC circuit 112 connected to the OOK output end 111, at least two OOK input ends 113, and at least two combiner modules 114 connected to both the direct current power end 110 and the RC circuit 112. The at least two combiner modules 114 are connected to the at least two OOK input ends 113 in a one-to-one correspondence manner. Each of the at least two combiner modules is connected to different RF modules by using one of the at least two OOK input ends. The direct current power end and the OOK output end are connected to a same serial port on the RCU.

Optionally, as shown in FIG. 3, each of the at least two combiner modules 114 may include the inductor L, the first capacitor C1, the second capacitor C2, the first diode P1, and the second diode P2.

One end of the inductor L is connected to one of the at least two OOK input ends 113, the other end of the inductor L is connected to one end of the first capacitor C1, the other end of the first capacitor C1 is grounded, one end of the first capacitor C1 is connected to a positive electrode of the first diode P1, a negative electrode of the first diode P1 is connected to the direct current power end 110, a positive electrode of the second diode P2 is connected to the one OOK input end, a negative electrode of the second diode P2 is connected to one end of the second capacitor C2, and the other end of the second capacitor C2 is connected to the OOK output end 111 by using the RC circuit 112.

The RC circuit 112 includes the resistor R and the third capacitor C3. One end of the resistor R is separately connected to the other end of the second capacitor C2 and one end of the third capacitor C3, the other end of the resistor R is grounded, and the other end of the third capacitor C3 is connected to the OOK output end 111.

For specific descriptions of the combiner unit shown in FIG. 2 and the combiner modules shown in FIG. 3, refer to related descriptions of the combiner unit shown in FIG. 2 and the combiner modules shown in FIG. 3 in the foregoing embodiments, and details are not described herein again.

In the electrical tilt method provided in this embodiment of the present disclosure, the electrical tilt method is applied to the electrical tilt apparatus provided in the embodiments of the present disclosure. The electrical tilt apparatus receives, at a time point, an electrical tilt signal sent by one of at least two RF modules. The at least two RF modules are connected to one serial port on an RCU in the electrical tilt apparatus by using one combiner unit in the electrical tilt apparatus, and the electrical tilt apparatus drives, according to the electrical tilt signal, a phase shifter that corresponds to the one RF module to move, to adjust a phase of an RF signal that is input to the phase shifter.

Based on the foregoing technical solution, the combiner unit is disposed in the electrical tilt apparatus provided in the embodiments of the present disclosure. Each combiner unit is connected to a different serial port on the RCU and connected to at least two RF modules, and each combiner unit in the electrical tilt apparatus receives, at a time point, only an electrical tilt signal sent by one of the at least two RF modules connected to the combiner unit, and performs, according to the electrical tilt signal, electrical tilt on an RF signal sent by the RF module. Therefore, in this embodiment of the present disclosure, more RF modules may be connected by using the combiner unit, thereby ensuring that when a quantity of serial ports on the RCU is limited, the electrical tilt apparatus implements independent electrical tilt on RF signals sent by more RF modules.

Figure 9:
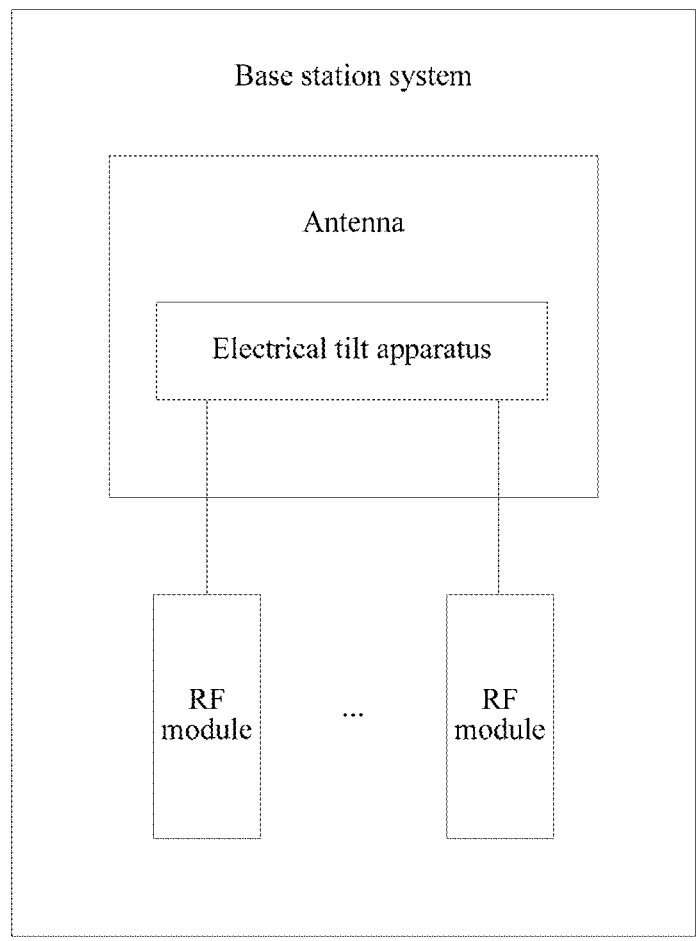
FIG. 9 is a schematic architectural diagram of a base station system according to an embodiment of the present disclosure.

As shown in FIG. 9, an embodiment of the present disclosure provides a base station system. The base station system may include the antenna described in FIG. 7, and at least two RF modules connected to the electrical tilt apparatus in the antenna. The electrical tilt apparatus in the antenna performs independent electrical tilt on RF signals sent by the at least two RF modules.

Specifically, for descriptions of a structure and a working principle of the electrical tilt apparatus, refer to related descriptions of the structure and the working principle of the electrical tilt apparatus shown in FIG. 1 to FIG. 6 in the foregoing embodiments, and details are not described herein again.

In the base station system provided in this embodiment of the present disclosure, a combiner unit is disposed in the electrical tilt apparatus in the antenna in the base station system, each combiner unit is connected to a different serial port on an RCU and connected to at least two RF modules, and each combiner unit receives, at a time point, only an electrical tilt signal sent by one of the at least two RF modules connected to the combiner unit, and performs, according to the electrical tilt signal, electrical tilt on an RF signal sent by the RF module. Therefore, in this embodiment of the present disclosure, more RF modules may be connected by using the combiner unit, thereby ensuring that when a quantity of serial ports on the RCU is limited, the electrical tilt apparatus implements independent electrical tilt on RF signals sent by more RF modules.

It may be clearly understood by a person skilled in the art that, for the purpose of convenient and brief description, division of the foregoing function modules is taken as an example for illustration. During actual application, the foregoing functions can be allocated to different function modules and implemented according to a requirement, that is, an inner structure of a device is divided into different function modules to implement all or some of the functions described above. For a detailed working process of the foregoing system, device, and unit, reference may be made to a corresponding process in the foregoing method embodiments, and details are not described herein again.

In the several embodiments provided in this application, it should be understood that the disclosed system, device, and method may be implemented in other manners. For example, the described device embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory, a random access memory, a magnetic disk, or an optical disc.

The foregoing descriptions are merely specific implementation of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An electrical tilt apparatus, comprising:
a remote control unit (RCU), at least one combiner unit, and multiple phase shifters connected to the RCU;
wherein each of the at least one combiner unit is configured to:
connect to a different serial port on the RCU and connect to at least two radio frequency (RF) modules,
receive, at a time point, an electrical tilt signal sent by one of the at least two RF modules, and
send the electrical tilt signal to the RCU;
wherein the RCU is configured to:
receive the electrical tilt signal sent by each combiner unit, and
drive, according to the electrical tilt signal, a first phase shifter that corresponds to a first RF module to move, to adjust a phase of an RF signal input to the first phase shifter, wherein the first RF module is configured to send the electrical tilt signal and the RF signal, and the first phase shifter is one of the multiple phase shifters; and wherein each combiner unit comprises a direct current power end, an on-off keying (OOK) output end, a resistance-capacitance (RC) circuit connected to the OOK output end, at least two OOK input ends, and at least two combiner modules connected to both the direct current power end and the RC circuit, the at least two combiner modules are connected to the at least two OOK input ends in a one-to-one correspondence manner, each of the at least two combiner modules is connected to different RF modules via one of the at least two OOK input ends, and the direct current power end and the OOK output end are connected to a same serial port on the RCU.

2. The electrical tilt apparatus according to claim 1, wherein:

each of the at least two combiner modules comprises an inductor, a first capacitor, a second capacitor, a first diode, and a second diode;

one end of the inductor is connected to one of the at least two OOK input ends, the other end of the inductor is connected to one end of the first capacitor, the other end of the first capacitor is grounded, one end of the first capacitor is connected to a positive electrode of the first diode, a negative electrode of the first diode is connected to the direct current power end, a positive electrode of the second diode is connected to the one OOK input end, a negative electrode of the second diode is connected to one end of the second capacitor, and the other end of the second capacitor is connected to the OOK output end via the RC circuit; and the RC circuit comprises a resistor and a third capacitor, one end of the resistor is separately connected to the other end of the second capacitor and one end of the third capacitor, the other end of the resistor is grounded, and the other end of the third capacitor is connected to the OOK output end.

3. The electrical tilt apparatus according to claim 1, wherein:

the RCU comprises a control module and a drive module connected to the control module;

each combiner unit is connected to a different serial port on the control module;

the control module is configured to: receive the electrical tilt signal sent by each combiner unit, and control, according to the electrical tilt signal, the drive module to drive the first phase shifter to move; and the drive module is connected to the multiple phase shifters and configured to drive, under the control of the control module, the first phase shifter to move, to adjust the phase of the RF signal input to the first phase shifter.

4. The electrical tilt apparatus according to claim 1, wherein:

the electrical tilt apparatus further comprises multiple bias tees (BTs);

each combiner unit is connected to each of the at least two RF modules via a different BT; and each of the multiple BTs is configured to separate an RF signal and an electrical tilt signal sent by an RF module connected to the BT.

5. The electrical tilt apparatus according to claim 1, wherein the electrical tilt apparatus further comprises at least one interface connected to the RCU and configured to connect to one RF module.

6. The electrical tilt apparatus according to claim 5, wherein:

each interface is connected to a different serial port on the RCU; and the serial port connected to each combiner unit on the RCU is different from the serial port connected to each interface.

7. An electrical tilt method, comprising:

receiving, by an electrical tilt apparatus at a time point, an electrical tilt signal sent by one of at least two radio frequency (RF) modules, wherein the at least two RF modules are connected to one serial port on a remote control unit (RCU) in the electrical tilt apparatus via a combiner unit in the electrical tilt apparatus; and driving, by the electrical tilt apparatus according to the electrical tilt signal, a phase shifter that corresponds to the one RF module to move, to adjust a phase of an RF signal that is input to the phase shifter, wherein the combiner unit comprises a direct current power end, an on-off keying (OOK) output end, a resistance-capacitance (RC) circuit connected to the OOK output end, at least two OOK input ends, and at least two combiner modules connected to both the direct current power end and the RC circuit, the at least two combiner modules are connected to the at least two OOK input ends in a one-to-one correspondence manner, each of the at least two combiner modules is connected to different RF modules via one of the at least two OOK input ends, and the direct current power end and the OOK output end are connected to a same serial port on the RCU.

8. The electrical tilt method according to claim 7, wherein:

each of the at least two combiner modules comprises an inductor, a first capacitor, a second capacitor, a first diode, and a second diode;

one end of the inductor is connected to one of the at least two OOK input ends, the other end of the inductor is connected to one end of the first capacitor, the other end of the first capacitor is grounded, one end of the first capacitor is connected to a positive electrode of the first diode, a negative electrode of the first diode is connected to the direct current power end, a positive electrode of the second diode is connected to the one OOK input end, a negative electrode of the second diode is connected to one end of the second capacitor, and the other end of the second capacitor is connected to the OOK output end via the RC circuit; and the RC circuit comprises a resistor and a third capacitor, one end of the resistor is separately connected to the other end of the second capacitor and one end of the third capacitor, the other end of the resistor is grounded, and the other end of the third capacitor is connected to the OOK output end.

9. An antenna, comprising:

an electrical tilt apparatus comprising a remote control unit (RCU), at least one combiner unit, and multiple phase shifters connected to the RCU, wherein:

each of the at least one combiner unit is configured to:
connect to a different serial port on the RCU and connect to at least two radio frequency (RF) modules;
receive, at a time point, an electrical tilt signal sent by one of the at least two RF modules; and
send the electrical tilt signal to the RCU, and the RCU is configured to:
receive the electrical tilt signal sent by each combiner unit; and drive, according to the electrical tilt signal, a first phase shifter that corresponds to a first RF module to move, to adjust a phase of an RF signal input to the first phase shifter, wherein the first RF module is configured to send the electrical tilt signal and the RF signal, and the first phase shifter is one of the multiple phase shifters; and multiple antenna elements connected to each phase shifter in the electrical tilt apparatus; and each combiner unit comprises a direct current power end, an on-off keying (OOK) output end, a resistance-capacitance (RC) circuit connected to the OOK output end, at least two OOK input ends, and at least two combiner modules connected to both the direct current power end and the RC circuit, the at least two combiner modules are connected to the at least two OOK input ends in a one-to-one correspondence manner, each of the at least two combiner modules is connected to different RF modules via one of the at least two OOK input ends, and the direct current power end and the OOK output end are connected to a same serial port on the RCU.

10. The antenna according to claim 9, wherein:

each of the at least two combiner modules comprises an inductor, a first capacitor, a second capacitor, a first diode, and a second diode;

one end of the inductor is connected to one of the at least two OOK input ends, the other end of the inductor is connected to one end of the first capacitor, the other end of the first capacitor is grounded, one end of the first capacitor is connected to a positive electrode of the first diode, a negative electrode of the first diode is connected to the direct current power end, a positive electrode of the second diode is connected to the one OOK input end, a negative electrode of the second diode is connected to one end of the second capacitor, and the other end of the second capacitor is connected to the OOK output end via the RC circuit; and the RC circuit comprises a resistor and a third capacitor, one end of the resistor is separately connected to the other end of the second capacitor and one end of the third capacitor, the other end of the resistor is grounded, and the other end of the third capacitor is connected to the OOK output end.

11. The antenna according to claim 9, wherein:

the RCU comprises a control module and a drive module connected to the control module;

each combiner unit is connected to a different serial port on the control module;

the control module is configured to: receive the electrical tilt signal sent by each combiner unit, and control, according to the electrical tilt signal, the drive module to drive the first phase shifter to move; and the drive module is connected to the multiple phase shifters and configured to drive, under the control of the control module, the first phase shifter to move, to adjust the phase of the RF signal input to the first phase shifter.

12. The antenna according to claim 9, wherein:

the electrical tilt apparatus further comprises multiple bias tees (BTs);

each combiner unit is connected to each of the at least two RF modules via a different BT; and each of the multiple BTs is configured to separate an RF signal and an electrical tilt signal that are sent by an RF module connected to the BT.

13. The antenna according to claim 9, wherein the electrical tilt apparatus further comprises at least one interface connected to the RCU and configured to connect to one RF module.

14. The antenna according to claim 13, wherein:

each interface is connected to a different serial port on the RCU; and the serial port connected to each combiner unit on the RCU is different from the serial port connected to each interface.

15. A base station system, comprising:

at least two radio frequency (RF) modules; and an antenna comprising:

an electrical tilt apparatus comprising a remote control unit (RCU), at least one combiner unit, and multiple phase shifters connected to the RCU, wherein:

each of the at least one combiner unit is configured to:
connect to a different serial port on the RCU and connect to the at least two RF modules,
receive, at a time point, an electrical tilt signal sent by one of the at least two RF modules, and
send the electrical tilt signal to the RCU; and the RCU is configured to:
receive the electrical tilt signal sent by each combiner unit; and
drive, according to the electrical tilt signal, a first phase shifter that corresponds to a first RF module to move, to adjust a phase of an RF signal input to the first phase shifter, wherein the first RF module is configured to send the electrical tilt signal and the RF signal, and the first phase shifter is one of the multiple phase shifters, and multiple antenna elements connected to each phase shifter in the electrical tilt apparatus; and each combiner unit comprises a direct current power end, an on-off keying (OOK) output end, a resistance-capacitance (RC) circuit connected to the OOK output end, at least two OOK input ends, and at least two combiner modules connected to both the direct current power end and the RC circuit, the at least two combiner modules are connected to the at least two OOK input ends in a one-to-one correspondence manner, each of the at least two combiner modules is connected to different RF modules via one of the at least two OOK input ends, and the direct current power end and the OOK output end are connected to a same serial port on the RCU.

16. The base station system according to claim 15, wherein:

each of the at least two combiner modules comprises an inductor, a first capacitor, a second capacitor, a first diode, and a second diode;

one end of the inductor is connected to one of the at least two OOK input ends, the other end of the inductor is connected to one end of the first capacitor, the other end of the first capacitor is grounded, one end of the first capacitor is connected to a positive electrode of the first diode, a negative electrode of the first diode is connected to the direct current power end, a positive electrode of the second diode is connected to the one OOK input end, a negative electrode of the second diode is connected to one end of the second capacitor, and the other end of the second capacitor is connected to the OOK output end via the RC circuit; and the RC circuit comprises a resistor and a third capacitor, one end of the resistor is separately connected to the other end of the second capacitor and one end of the third capacitor, the other end of the resistor is grounded, and the other end of the third capacitor is connected to the OOK output end.

* * * * *